United States Patent [19]

Teti

[11] 4,023,030
[45] May 10, 1977

[54] HEADLIGHT MOUNT FOR MINE VEHICLE

[76] Inventor: John J. Teti, P.O. Box 756, Saltville, Va. 24370

[22] Filed: Sept. 22, 1975

[21] Appl. No.: 615,165

[52] U.S. Cl. .............................. 240/8.2; 240/7.1 H; 240/57; 240/61.5
[51] Int. Cl.² ................................................ B60Q 1/32
[58] Field of Search ............ 240/8.2, 7.1 H, 61.5, 240/57, 62, 62.52; 214/500 T, 78, 80; 248/286, 280, 285; 217/60 R

[56] References Cited

UNITED STATES PATENTS

| | | | |
|---|---|---|---|
| 2,557,872 | 6/1951 | Holland | 240/8.2 X |
| 2,571,130 | 10/1951 | Hargis | 240/8.2 |
| 2,731,544 | 1/1956 | Kayser, Sr. | 240/8.2 X |
| 2,781,443 | 2/1957 | Cargle | 240/8.2 |
| 2,804,539 | 8/1957 | Robbins | 240/8.2 X |
| 2,996,606 | 8/1961 | Klar | 240/8.2 X |
| 3,229,945 | 1/1966 | Hartman | 240/57 X |
| 3,742,205 | 6/1973 | Beauregard et al. | 240/57 X |

Primary Examiner—Richard A. Wintercorn
Attorney, Agent, or Firm—Bacon & Thomas

[57] ABSTRACT

A mining machine having a tiltable and forwardly open scoop has a headlight mounted on the rear wall of the scoop and positioned to project a beam of light forwardly but along side a side wall of the scoop, no part of the headlight projecting above the machine. The headlight is mounted for sliding inwardly behind the scoop when a lateral obstruction is encountered but is biased to its outer position. An obstruction-engaging bumper link pushes the headlight inwardly. A linkage keeps the headlight beam horizontal when the scoop tilts.

5 Claims, 10 Drawing Figures

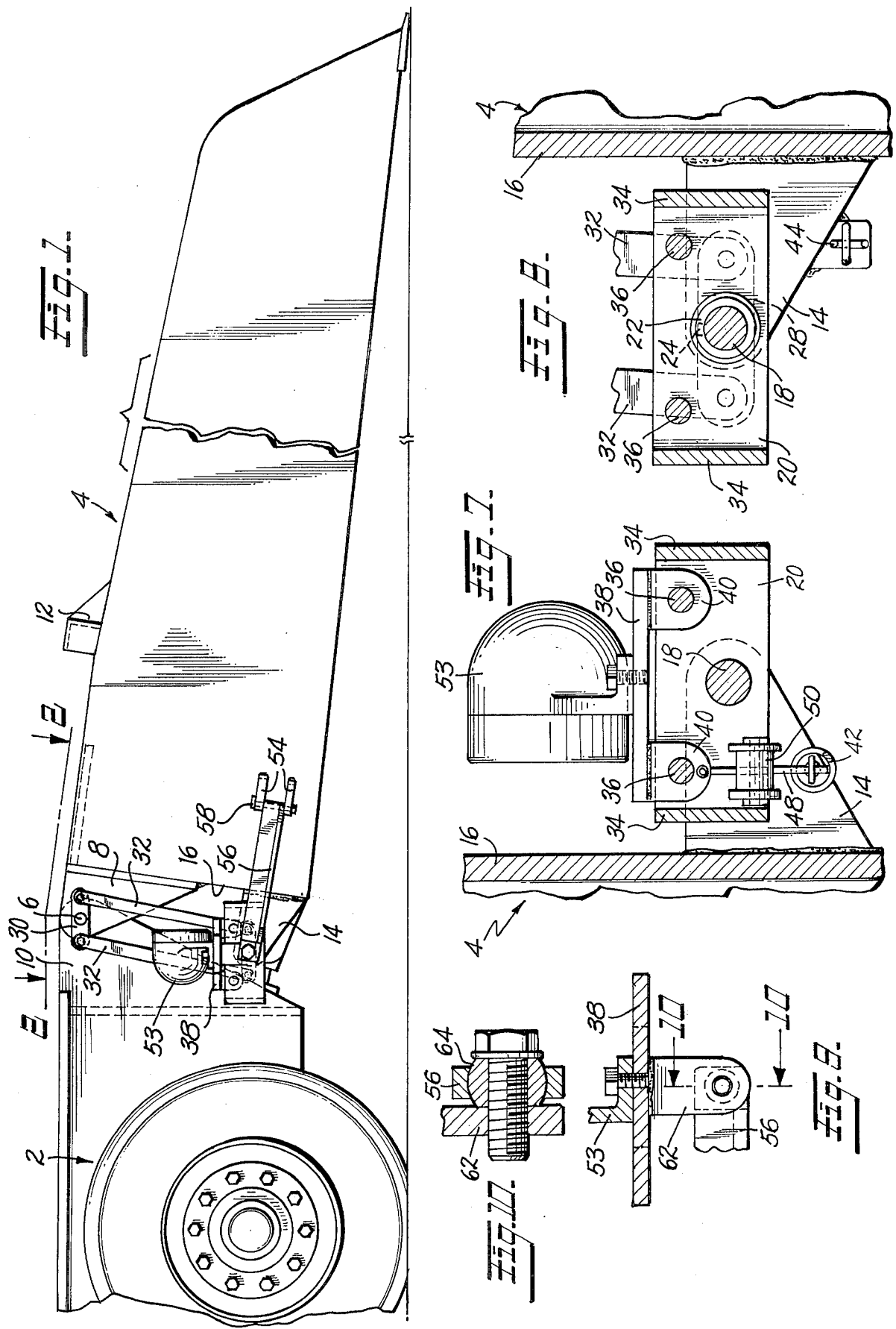

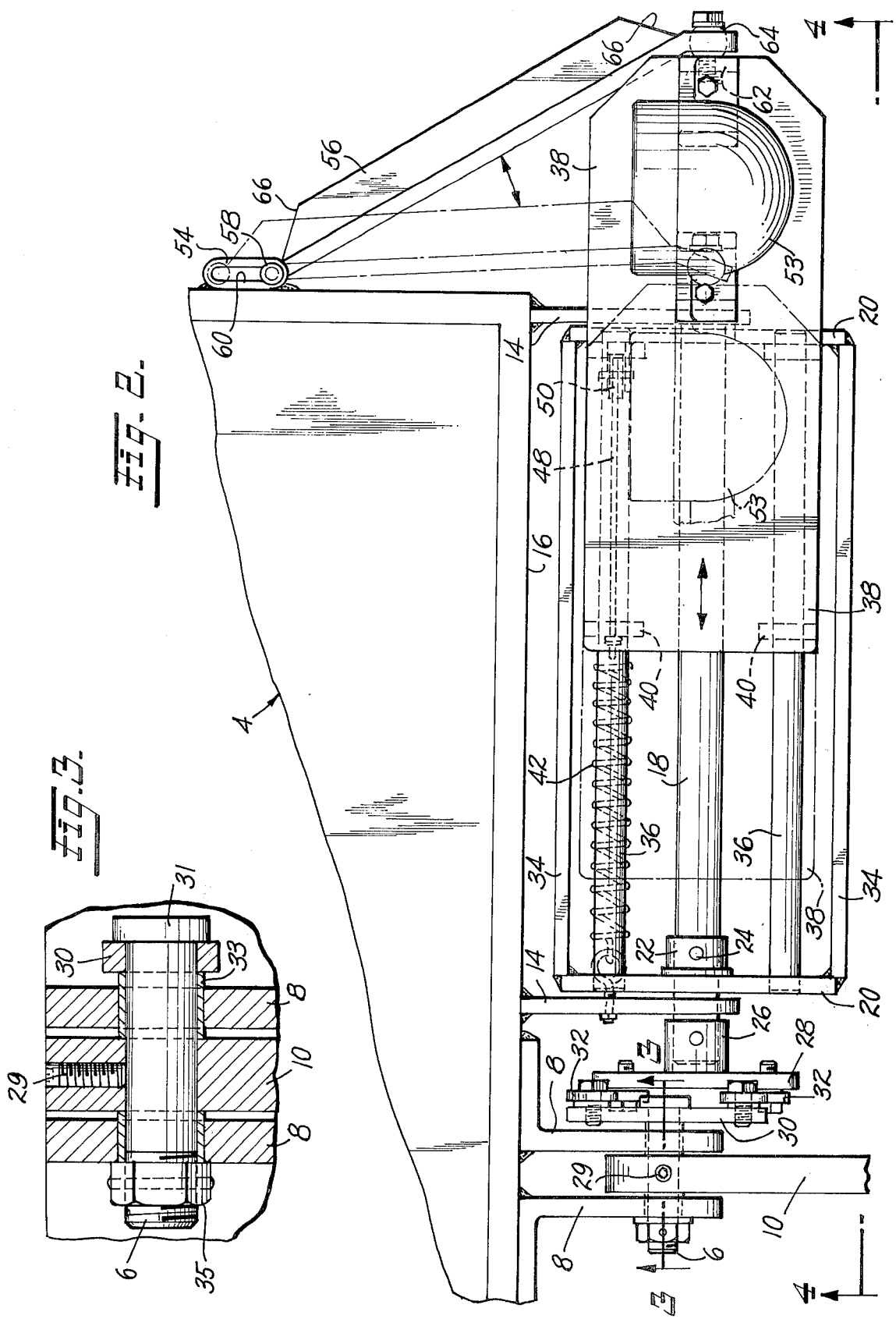

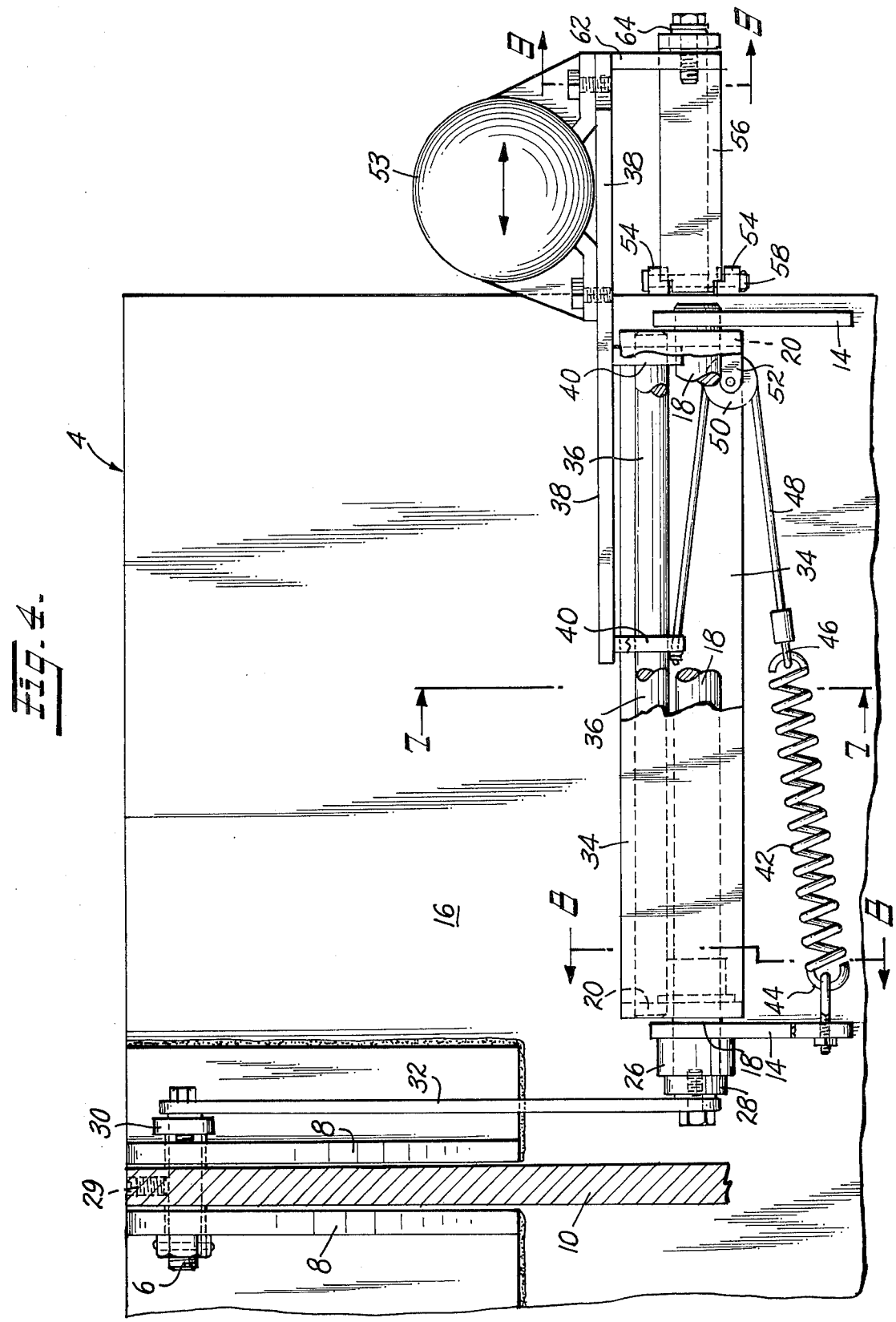

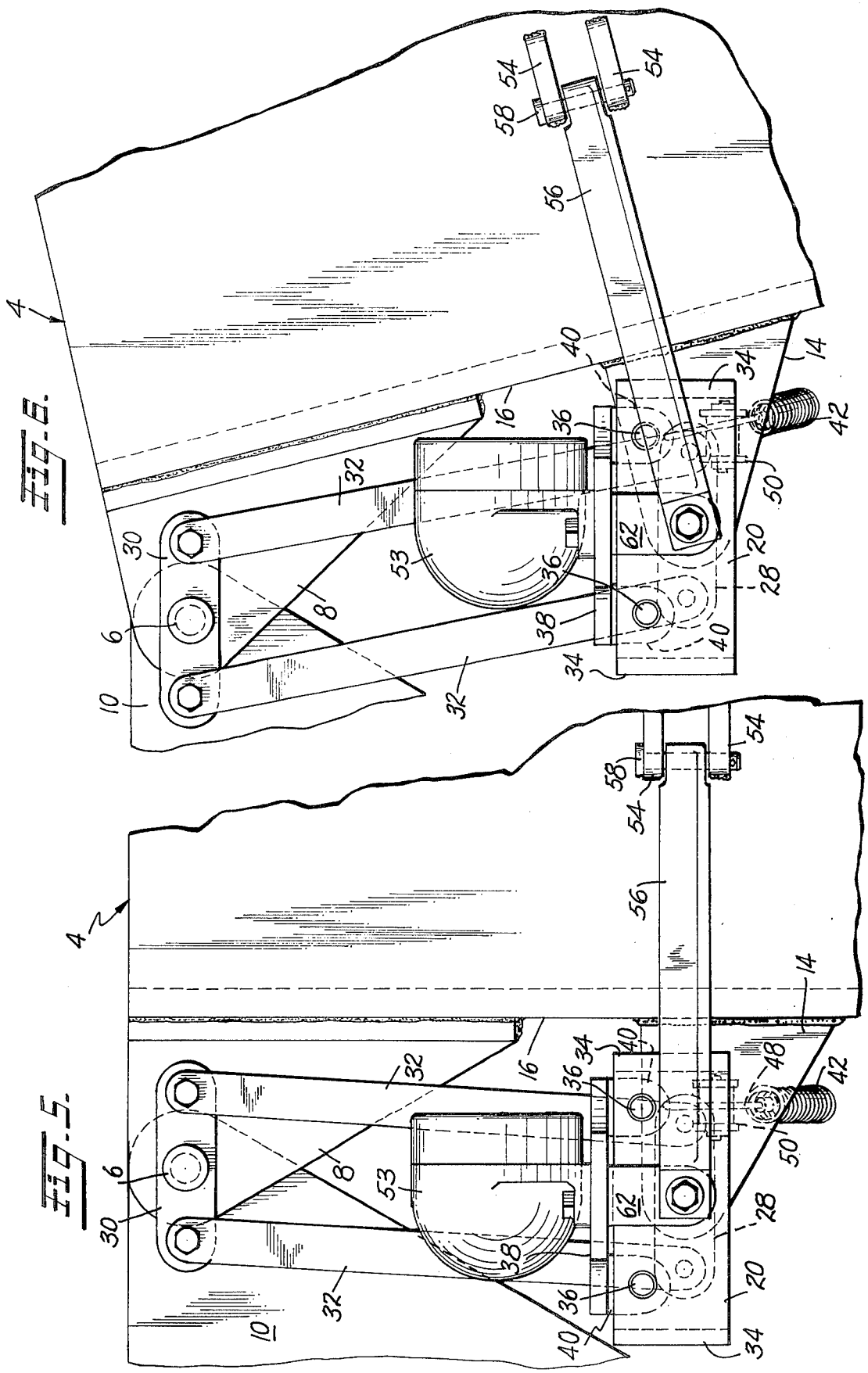

HEADLIGHT MOUNT FOR MINE VEHICLE

BACKGROUND OF THE INVENTION

This invention is in the field of accessories for mining machines.

Many mining machines are employed in mines of low ceiling height and narrow entries, which results in difficult headlight locations for the apparatus. Severe damage and destruction of lights results when low roof obstructions or side wall obstructions are encountered. Such damage may result in an electrical short and, therefore, arcing, which would result in an explosion if methane gas were present. Damage is most severe in the case of scoop machines used in these environments. These machines are heavy articulated steerable units of low profile and with scoop buckets mounted on the front. The bucket is pivoted for limited vertical tilting movement to load and unload the material. Usually a blade in the bucket is pushed horizontally forwardly to push gathered material from the bucket. It is common practice to mount a headlight behind the bucket directed through the back of the scoop and through a hole in the blade. With this system, however, no light is available in front of the machine when the bucket is loaded with material.

SUMMARY OF THE INVENTION

A principal object of this invention is to provide a headlight for a mining machine which is directed to provide light forwardly of the machine at all times and which light is mounted for automatic retraction upon encountering an obstruction that would otherwise damage the headlight structure.

Further objects and advantages will become apparent to those skilled in the art as the description proceeds with reference to the accompanying drawings.

BRIEF DESCRIPTION OF THE DRAWINGS

FIG. 1 is a side elevational view of a machine embodying the present invention, parts thereof being only fragmentarily shown;

FIG. 2 is an enlarged top plan view of a portion of FIG. 1;

FIG. 3 is an enlarged sectional view taken on the line 3—3 of FIG. 2;

FIG. 4 is a rear view of FIG. 2, taken along the line 4—4 of FIG. 2;

FIG. 5 is a side elevational view of the portions of the apparatus shown in FIG. 4 with the scoop in a lowered position;

FIG. 6 is a view similar to FIG. 5 but showing the relationship of the parts when the scoop is elevated;

FIG. 7 is a sectional view taken on the line 7—7 of FIG. 4;

FIG. 8 is a section taken on the line 8—8 of FIG. 4;

FIG. 9 is a sectional view taken on the line 9—9 of FIG. 4; and

FIG. 10 is an enlarged sectional view taken on the line 10—10 of FIG. 9.

DESCRIPTION OF A PREFERRED EMBODIMENT

Referring first to FIG. 1, numeral 2 indicates only the front portion of an articulated steerable vehicle commonly used in mining operations. A forwardly open scoop 4 is mounted on the vehicle 2 by means of stub shaft members 6 pivotally connecting ears 10 extending forwardly of the vehicle to brackets 8 on the rear of the scoop. Suitable hydraulic means are provided for tilting the scoop around the stub shafts 6 but are not shown herein, such devices being common in the art. The scoop is further provided with a plate member 12 movable forwardly and rearwardly within the scoop and used to push collected material therefrom. Such pusher plates are also conventional and form no part of the present invention.

A further pair of bracket plates or ears 14 are welded or otherwise secured to the rear wall 16 of the scoop and they support a transverse shaft member 18 for rotation. Secured to the shaft 18 are end plates 20 having collars 22 fixed to the shaft 18 by set screws 24 or the like. The shaft 18 extends through at least the inner bracket plate 14 and is journalled therein for rotation. Secured to the inner end of the shaft 18 is a further hub 26 carrying a bar 28 fixed thereto.

At least one of the stub shafts 6 is fixed against rotation in the flange or plate 10 on which the scoop is pivotally mounted. As shown, a screw 29 secures the shaft 6 against rotation. On the end of shaft 6 nearest the adjacent bracket plate 14 is fixed a further lever or bar 30 in parallel relation to the bar 28 previously referred to. The bar 30 is fixed to shaft 6 by being clamped between head 31 (FIG. 3) and a bushing 33 abutting ear 10 and held clamped by nut 35. The ends of the bar 30 and bar 28 are pivotally joined by parallel links 32 of equal length. Thus, an articulated parallelogram is provided so that any and all tilting movements of the scoop 4 about the stub shaft 6 results in maintaining the bar 28 and shaft 18 along with end plates 20 at all times parallel to their original position, which in this case is preferably horizontal.

Side plates 34 are welded or otherwise secured to the end plates 20 to define a box-like structure. Also, extending between and fixed to the end plates 20 in spaced parallel relation are guide rods 36 parallel to shaft 18.

A headlight support plate 38 is provided with depending ears 40 having perforations therein slidably embracing the guide rods 36. Thus, the support plate 30 is movable laterally of the vehicle. A tension spring 42 has one end 44 secured to one of the bracket plates 14 and its other end is engaged with a loop 46 on the end of a cable or the like 48. The cable 48 is trained about a guide pulley 50 mounted on a bracket 52 secured to the outer bracket plate 14. From the guide pulley 50 the cable 48 extends to the innermost end of the support plate 38 and is secured to one of the ears 40. Thus, the spring 42 constantly urges the support plate 38 to its outermost position shown in FIG. 4 in which the outer ears 40 engage outer end plate 20 to thus limit outward movement of the slidable support plate.

As shown particularly in FIGS. 2 and 4, a headlight 53 of any suitable design is mounted on the outer end of the support plate 38 and arranged so that its beam of light is directed forwardly of the vehicle outwardly of the side wall of the scoop 4. Thus, the headlight 53 provides illumination at the front of the scoop irrespective of whether or not the scoop is full of material.

Slotted brackets 54 are secured to the side wall of the scoop 4 somewhat ahead of the headlight 52 and slightly therebelow. A link member 56 preferably in the form of an angle iron is provided with trunnions or pins 58 received in and slidable along the slots 60 of brackets 54. The link 56 extends rearwardly and outwardly to the outermost end of the support plate 38 and is there pivoted to a bracket 62 secured to the support plate 38 and having a ball segment 64 thereon (see FIG. 10) on which the rearmost end of the link 56 is journalled. Thus, the link 56 is provided with a universal pivotal connection to the outer end of the support plate 38. The horizontal flange portion of the link 56 is bevelled at both ends, as shown at 66.

From the description thus far it will be apparent that the headlight 52 will normally provide a continuous beam of light at the front of the apparatus but in the event the vehicle, in moving forwardly, encounters a side wall obstruction which could damage the headlight, that obstruction will engage the outer edge of the horizontal flange of link 56 and forward movement of the vehicle will result in "camming" link 56 inwardly to forcibly slide the support plate 38 inwardly against the tension of spring 42. As the link 56 swings inwardly and since its rear end must move on a straight line, the slot 60 permits forward sliding movement of the front end of the link. As will be obvious, the outer edge of the horizontal flange of link 56 will be outermost and will be the only element engaging the obstruction referred to. After the vehicle moves forwardly beyond the obstruction, the spring 42 then returns the headlight support to its outermost position to maintain proper illumination at the front of the vehicle.

FIGS. 5 and 6 illustrate the movement of the parts during tilting of the scoop 4 and illustrates the fact that the headlight beam is at all times maintained horizontal.

Obviously, a similar headlight support could be provided on the other side of the scoop if desired and a link similar to the link 56 could be provided to extend rearwardly and inwardly to retract the headlight if a side wall obstruction is encountered while moving rearwardly with the machine.

While a single specific embodiment of the invention has been shown herein, the same is merely illustrative of the principles involved and other embodiments may be resorted to within the scope of the appended claims.

I claim:

1. A headlight mount for a mine vehicle having a wheeled body and a transverse member, provided with a rear wall, at the front thereof, said headlight mount comprising:

a support on the rear wall of said transverse member and having a first position extending laterally outwardly thereof;

a headlight mounted on said support adjacent the outer end thereof and arranged to direct a light beam forwardly alongside an end of said member;

said support being mounted for inward movement to a second position with said headlight behind said member;

biasing means urging said support outwardly to said first position;

means connected to said support and positioned to engage any obstruction adjacent the path of movement of said vehicle and move said support to its second position in response to forward movement of said vehicle along said obstruction;

said support being slidably mounted on a frame for movement between said first and second positions, said frame being mounted on said rear wall for tilting about a laterally extending axis; and parallel linkage means connecting said frame and said wheeled body to maintain said light beam in substantially fixed orientation relative to said wheeled body irrespective of tilting of said member.

2. A headlight mount as defined in claim 1 wherein said member is pivoted to said wheeled body on shaft means fixed to said body adjacent the upper edge of said rear wall, said parallel linkage comprising at least one pair of spaced parallel links pivoted at their upper ends to said fixed shaft means and depending therefrom to said frame, the lower ends of said links being pivoted to said frame.

3. A headlight mount as defined in claim 1 wherein said frame includes parallel side rods extending in the direction of movement of said support, said support comprising a platform overlying said frame and having pairs of depending ears slidably embracing said slide rods.

4. A headlight mount as defined in claim 1 wherein said means connected to said support comprises a bumper link having a forward end and means connecting said forward end for fore-and-aft sliding along said one side wall and for lateral pivoting about said forward end, the rear end of said bumper link being pivotally connected to the outer end of said support.

5. A headlight mount as defined in claim 4 wherein said bumper link is provided with an outwardly extending flange the outer edge of which is the outermost portion of said mount at least when said support is in said second position.

* * * * *